(12) United States Patent
Dugan

(10) Patent No.: US 8,266,207 B2
(45) Date of Patent: Sep. 11, 2012

(54) SYSTEMS AND METHODS FOR ONLINE INFORMATION EXCHANGE USING SERVER-MEDIATED COMMUNICATION ROUTING

(76) Inventor: Casey A. Dugan, Everett, MA (US)

( * ) Notice: Subject to any disclaimer, the term of this patent is extended or adjusted under 35 U.S.C. 154(b) by 935 days.

(21) Appl. No.: 11/105,224

(22) Filed: Apr. 13, 2005

(65) Prior Publication Data

US 2006/0235969 A1    Oct. 19, 2006

(51) Int. Cl.
*G06F 15/16* (2006.01)
(52) U.S. Cl. ............ 709/204; 709/205; 709/206
(58) Field of Classification Search ............ 709/204
See application file for complete search history.

(56) References Cited

U.S. PATENT DOCUMENTS

| | | | |
|---|---|---|---|
| 4,048,452 A | 9/1977 | Oehring et al. | |
| 5,812,865 A | 9/1998 | Theimer et al. | |
| 5,875,436 A * | 2/1999 | Kikinis | 705/34 |
| 5,884,032 A | 3/1999 | Bateman | |
| 6,201,814 B1 | 3/2001 | Greenspan | |
| 6,260,148 B1 | 7/2001 | Aggarwal et al. | |
| 6,301,609 B1 | 10/2001 | Aravamudan et al. | |
| 6,449,344 B1 | 9/2002 | Goldfinger et al. | |
| 6,480,885 B1 | 11/2002 | Olivier | |
| 6,484,196 B1 * | 11/2002 | Maurille | 709/206 |
| 6,591,112 B1 | 7/2003 | Siccardo | |
| 6,614,902 B1 | 9/2003 | Rizzetto | |
| 6,677,968 B1 | 1/2004 | Appelman | |
| 6,760,580 B2 | 7/2004 | Robinson et al. | |
| 6,788,946 B2 | 9/2004 | Winchell | |
| 2001/0013050 A1 * | 8/2001 | Shah | 709/202 |
| 2002/0160757 A1 * | 10/2002 | Shavit et al. | 455/414 |
| 2003/0097408 A1 * | 5/2003 | Kageyama et al. | 709/205 |
| 2004/0015548 A1 * | 1/2004 | Lee | 709/204 |
| 2004/0114735 A1 * | 6/2004 | Arning et al. | 379/93.24 |
| 2004/0158529 A1 * | 8/2004 | Bray et al. | 705/52 |
| 2004/0193691 A1 * | 9/2004 | Chang | 709/206 |
| 2005/0038893 A1 * | 2/2005 | Graham | 709/228 |
| 2005/0289039 A1 * | 12/2005 | Greak | 705/37 |
| 2006/0031305 A1 * | 2/2006 | Keohane et al. | 709/206 |
| 2006/0031358 A1 * | 2/2006 | Canis | 709/206 |
| 2006/0059495 A1 * | 3/2006 | Spector | 719/310 |
| 2007/0244766 A1 * | 10/2007 | Goel | 705/26 |
| 2008/0209347 A1 * | 8/2008 | Malik et al. | 715/758 |

* cited by examiner

*Primary Examiner* — Kenny Lin
*Assistant Examiner* — Shaq Taha
(74) *Attorney, Agent, or Firm* — Ropes & Gray LLP (57) ABSTRACT

The invention, in one embodiment, relates to facilitating communications between a user and one or more members of one or more groups by routing the communications from the user to particular group members based, at least in part, for example, on information known about: the communication; the one or more groups; and/or the one or more group members.

33 Claims, 6 Drawing Sheets

SYSTEMS AND METHODS FOR ONLINE INFORMATION EXCHANGE USING SERVER-MEDIATED COMMUNICATION ROUTING

FIELD OF THE INVENTION

The invention generally relates to on-line communications between a user and one or more members of one or more groups. More particularly, the invention, in one embodiment, relates to facilitating such communications by routing them from a user to a particular group member, based at least in part, for example, on information known about: the communication; the one or more groups; and/or the one or more group members.

BACKGROUND

Many modes of on-line communication over networks exist in the art. By way of example, real-time messaging systems exist, where users are provided with unique identifiers and may define themselves as part of a group (e.g., friends or family members). As such, a member of a group can identify when other members of the group are on-line and exchange messages, in real-time, with those members. Conventional real-time messaging systems suffer from the drawback that a recipient's unique identifier must be known and a user's group members must be on-line to communicate. If they are not, communications are typically not stored for later delivery.

Another mode of on-line communication is commonly referred to as a "chat room." In these systems, a user typically logs into the site. Once logged in, any message a user sends is broadcast to everyone else logged into the chat room. Messages sent are typically displayed on a common message space, which may fill up quickly, depending on the activity within the particular room. Any number of users, including none, may respond to any message sent to the chat room. These responses are also displayed on the common message space. In many cases, chat rooms are focused around a particular topic, interest, or category of user (e.g., teen, college student, senior citizen, or the like). Users may participate in any number of chat rooms at the same time. Chat rooms suffer from the drawback that all postings are public and there is no limit to the number of responses one might receive to a question, comment or request for advice. Also, there is no quality control with regard to the competence of the person providing a response to a question or request for advice with regard to a particular topic.

Bulletin boards provide another mode of on-line communication. In the case of Bulletin boards, users need not be logged on at the same time to exchange communications. Bulletin boards are similar to chat rooms in that all postings are typically public. However, unlike chat rooms, communication does not typically occur in real-time. A user may post questions and/or comments, for example, on a common message space. Over a period of time, others may log into the bulletin board and post responses to the user's comments and/or comments. This process typically continues in an ongoing fashion. Bulletin boards suffer from the same deficiencies as chat rooms, along with the further deficiency of communications not necessarily being in real-time.

Emails are another mode of on-line communication in which messages may be passed between users, without requiring that the users be connected to the network at the same time. In this case, a sender typically specifies an email address of the person(s) (i.e., recipient(s)) to whom the email is being sent. The sender may also specify a plurality of recipient email addresses as an email "group," which when received by a server, causes the email to be sent to the entire group of recipients. Emails suffer from the drawback that a sender must wait for a response until a recipient logs onto the network and reads his/her email. A unique identifier for the recipient(s) is required in these communications as well.

Help desk models provide other modes of on-line communication. Modern computer network help desk models typically operate in a similar fashion to conventional telephone-based help desk models. More particularly, the telephone-based version employs an Automatic Call Distribution (ACD) system for routing help requests. ACD systems typically include a plurality of operators and a system for receiving and routing requests. When a request is received, it is forwarded to the next available service person. In this kind of system, the user has no advance notice of the service person that responds to the request. Users are limited in the number of simultaneous requests they can place to the system at any time. Service persons are also limited, to a lesser degree, in the number of requests they can process at any one time.

Additional drawbacks of ACD systems relate to time consumption and efficiency. By way of example, if a service person determines he/she is unqualified to help the user, he/she typically routes the user back into a queue, in some cases, a queue of service persons uniquely qualified to attend to the particular type of problem the user is experiencing. The user then waits again to be routed out of the queue. If the service person attempts to provide assistance, and subsequently determines that he/she is unqualified to provide the assistance, the user is once again typically routed back into the queue. The process can be time consuming and in some cases require the user to wait in multiple queues prior to receiving any meaningful assistance.

Accordingly, there is a need for a new paradigm for enabling users to exchange information in a online environment.

SUMMARY

The invention addresses the deficiencies of the prior art by providing, in various embodiments, systems and methods for enabling a user to communicate, possibly in real-time, with one or more members of one or more member groups. The user may be a member of one or more of the groups, but this need not be the case.

According to one aspect, the invention provides systems and methods for communicating over a computer network. According to this aspect, the invention receives a communication from a user at a server computer via the network. The server computer scans the communication to determine substantive characteristics of the communication. Alternatively, the user may provide some or all of the substantive characteristics of the communication to the server computer. Substantive characteristics of the communication may include, without limitation, the relevant field of the communication. The relevant field may include, for example, an academic field, such as a particular area of mathematics, literature, biology, chemistry, physics, language, engineering, art, politics, geography or the like. The field may also include other fields of relevancy, such as automotives, construction, plumbing, masonry, electrical wiring or the like. It may also include a sports field, such as baseball, basketball, football, soccer, tennis, golf, skiing, sailing, skateboarding, ice skating, bicycling and the like. The relevant field may also include any keywords thought to be relevant by the user. Preferably, the invention provides an on-line form for the user to complete to provide field information for the communication.

The server computer compares the substantive characteristics of the communication with substantive characteristics of a plurality of members of one or more member groups. Preferably, the group members each provide their substantive characteristics to the server computer at the time of joining a group, for example, via an on-line form. Group member substantive characteristics may include, without limitation, educational background, educational status, fields of expertise, abstracts of publications, patents, age, gender, willingness to receive communication, willingness to provide on-line advice, willingness to be in direct (non-anonymous) communication with a sender of a communication, a list of group memberships, or the like. The server computer may augment the substantive characteristics for group members, for example, by including the last time a group member has received/responded to a communication, how active the group member is within the group, how long the group member has been subscribed to the group, or the like. Group member substantive characteristics may also include any of the characteristics listed above with regard to the substantive characteristics of the communication. Based, at least in part, on this comparison, the server computer routes the communication to a first of the plurality of group members.

According to another feature, the server computer compares the substantive characteristics of the communication with the substantive characteristics of each of the available groups to determine which of the plurality of groups should have its members considered for communication routing. The substantive characteristics of the groups may include, for example, a common field of interest, knowledge or expertise of the group members. More specifically, a common field of interest, knowledge or expertise may include, for example, an academic field, such as a particular area of mathematics, literature, language, biology, chemistry, physics, engineering, art, music, politics, history, geography or the like. The field may also include other fields of common interest, knowledge or expertise, such as automotives, construction, plumbing, masonry, electrical wiring, landscaping or the like. It may also include a field of sports, such as baseball, basketball, football, soccer, tennis, golf, skiing, sailing, skateboarding, ice skating, bicycling or the like. The substantive characteristics of a particular group may also include substantive characteristics of the group members.

According to one configuration, the server computer routes the communication to only the first of the plurality of members. However, in other configurations, the user can specify to the server computer the number of groups and/or members to whom the user wants the communication routed. Optionally, the user can specify to the server computer particular ones of the member groups to which the communication is to be routed, regardless of the results of the comparison of the substantive characteristics. According to another feature, the user can specify the groups the server should consider when determining to whom to forward the message. In some embodiments, the user can specify which of the group member and/or communication substantive characteristics to consider when determining to whom to route the communication.

According to another feature, the server computer determines and/or tracks which groups have members logged into the network and who those group members are. The server computer can then use this information during the determination of to whom to route the communication from the user.

According to one embodiment, the group member who receives the communication from the server computer has the option of answering the communication, forwarding the communication to another group member, responding to the server computer that he/she declines to respond substantively to the communication, or ignoring the communication. In the case of the member explicitly declining, the server computer routes the communication to the next best option of on-line group members. In the case of the member ignoring or forwarding the communication, the server forwards the communication to another member after waiting a time-out period.

In response to receiving a response from the group member to whom the communication was routed, the server computer sends the response to the user at the client device. Depending on preferences expressed by the user and by the particular group member, the server computer may additionally or alternatively provide the user and/or the particular group member with contact information for the other to initiate a direct dialog between the user and the group member. According to another feature, the server computer assigns members to groups based, at least in part, on substantive characteristics of the type discussed above for groups and members.

According to other embodiments, the invention includes features directed to generating revenue from the systems and methods of the invention. By way of example, in one embodiment, the user is charged a fee for routing the communication to one or more group members. The fee may be, for example, a period fee, a per communication fee or other fee. According to another embodiment, group members are charged a fee for belonging to a group. In some configurations, they are charged a per group fee, while in other configurations, they are charged a periodic fee. In some instances, group members may be paid or earn discounts on membership by responding to communications from the server computer, and/or agreeing to be available to respond to such communications. It should be noted that users may also be group members and vice versa.

There are numerous applications for the systems and methods of the invention, by way of example, the invention can be employed by users who want to communicate with others interested in discussing a particular topic, but do not desire the public nature of a chat room or bulletin board. The invention may also be used for knowledge exchanged between group members who are experts in a particular field and for providing such knowledge to users seeking information about the particular field. In some implementations, this may take the form of a tutoring system, with professors being members of groups and students seeking help sending messages to those groups.

The invention may also be employed as an enhanced customer support system in which customer support personnel are members of a group and customers can send questions to the server computer, which can route the questions to members qualified to answer the questions. The server computer can make a first estimate as to which of the group members is most helpful and as to which group members are available. The group member to whom the server computer routes the communication can then decide, after seeing a communication, if he or she has the expertise to answer that particular communication. If not, the initial group member can, for example, cause the server computer to automatically forward it to another customer support member or specify another customer support group to whom it may be forwarded.

Systems and methods of the invention may also be implemented as a mechanism for finding goods and/or services, where those providing goods and/or services are members of a group, with those seeking the goods and/or services sending communication, including a good/service request to the server computer, which routes the communication to an group and/or member.

According to another embodiment, the invention may be implemented through email. In this case, the message passing may not happen in real-time. However, may a timeout may still occur if a member does not respond in a timely fashion to an email forwarded by the system.

Other systems, methods, implementations and features of the invention are described below with respect to illustrative embodiments.

BRIEF DESCRIPTION OF THE DRAWINGS

Systems, methods and features of the invention are described below with reference to the appended drawing, which are provided solely by way of illustration, and in which.

ILLUSTRATIVE DESCRIPTION

As described above in summary, the invention provides in various embodiments, systems and methods for facilitating online communications between a user and one or more members of one or more groups by routing communications from the user to particular group members based, at least in part, on information known about: the communication; the one or more groups; and/or the one or more group members. The user may subscribe to one or more groups as a member, but this need not be the case.

Figure 1:
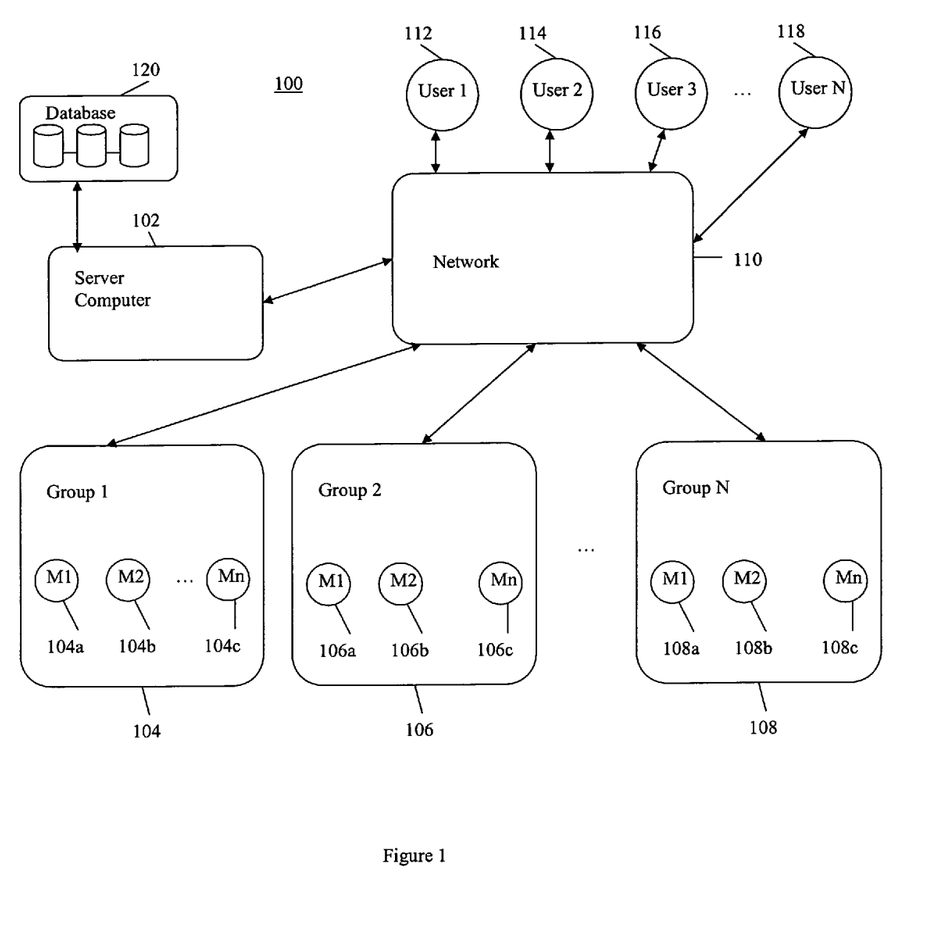
FIG. 1 is a conceptual block diagram of a system for providing server-mediated communication routing for exchange of information according to an illustrative embodiment of the invention.

FIG. 1 is a conceptual block diagram depicting a system 100 for providing server-mediated communication routing for exchange of information over a network 110, according to an illustrative embodiment of the invention. The network 110 may be any suitable network, including, a private network, intranet, or extranet, such as the Internet. According to the illustrative embodiment, a plurality of users, such as the users 112, 114, 116 and 118 are in operable communication to the network 110 by way of any suitable mechanism (e.g., telephone dialup modem, broadband telephone modem, cable modem, wireless modem or the like) and any suitable client device. (e.g., a personal digital assistant, mobile telephone, handheld computer, laptop computer, desktop computer, or workstation). A plurality of group members, such as group members 104a-104c, 106a-106c and 108a-108c, conceptually organized into member groups, such as the member groups 104, 106 and 108, are also in operable communication with the network 110 via any suitable client device. A server computer 102 operably connected to the network 110 is programmed to provide the above summarized features, which are described in further detail below. A database 120 in operable communication with the server computer 102 stores information about users, groups and group members.

The illustrative groups 104, 106 and 108 are formed based on substantive characteristics of the group. Substantive characteristics of a group include, for example, a common field of interest, knowledge or expertise of the group members. More specifically, a common field of interest, knowledge or expertise may include, for example, an academic field, such as a particular area of mathematics, literature, language, biology, chemistry, physics, engineering, art, music, politics, history, geography or the like. The field may also include other fields of common interest, knowledge or expertise, such as automotives, construction, plumbing, masonry, electrical wiring, landscaping or the like. It may also include a field of sports, such as baseball, basketball, football, soccer, tennis, golf, skiing, sailing, skateboarding, ice skating, bicycling, auto racing or the like. The substantive characteristics of a particular group, such as group 104, may also include substantive characteristics of the group members, such as the group members 104a, 104b and 104c. The substantive characteristics of each of the groups 104, 106 and 108 are stored in the database 120.

Substantive characteristics of group members may include, without limitation, educational background, work experience, life experience, educational status, fields of expertise, abstracts of publications, patents, age, gender, ethnic background, religion, memberships in organizations, willingness to receive communication, willingness to provide on-line advice, willingness to be in direct (non-anonymous) communication with a sender of a communication, a list of group memberships, or the like. The server computer 102 may augment the substantive characteristics for group members, for example, by including the last time a group member has received/responded to a communication, how active the group member is within the group, how long the group member has been subscribed to the group, or the like. Group member substantive characteristics may also include any of the characteristics listed above with regard to the substantive characteristics of the communication. The substantive characteristics of the group members 104a-104c, 106a-106c and 108a-108c are also stored in the database 120.

Figure 2:
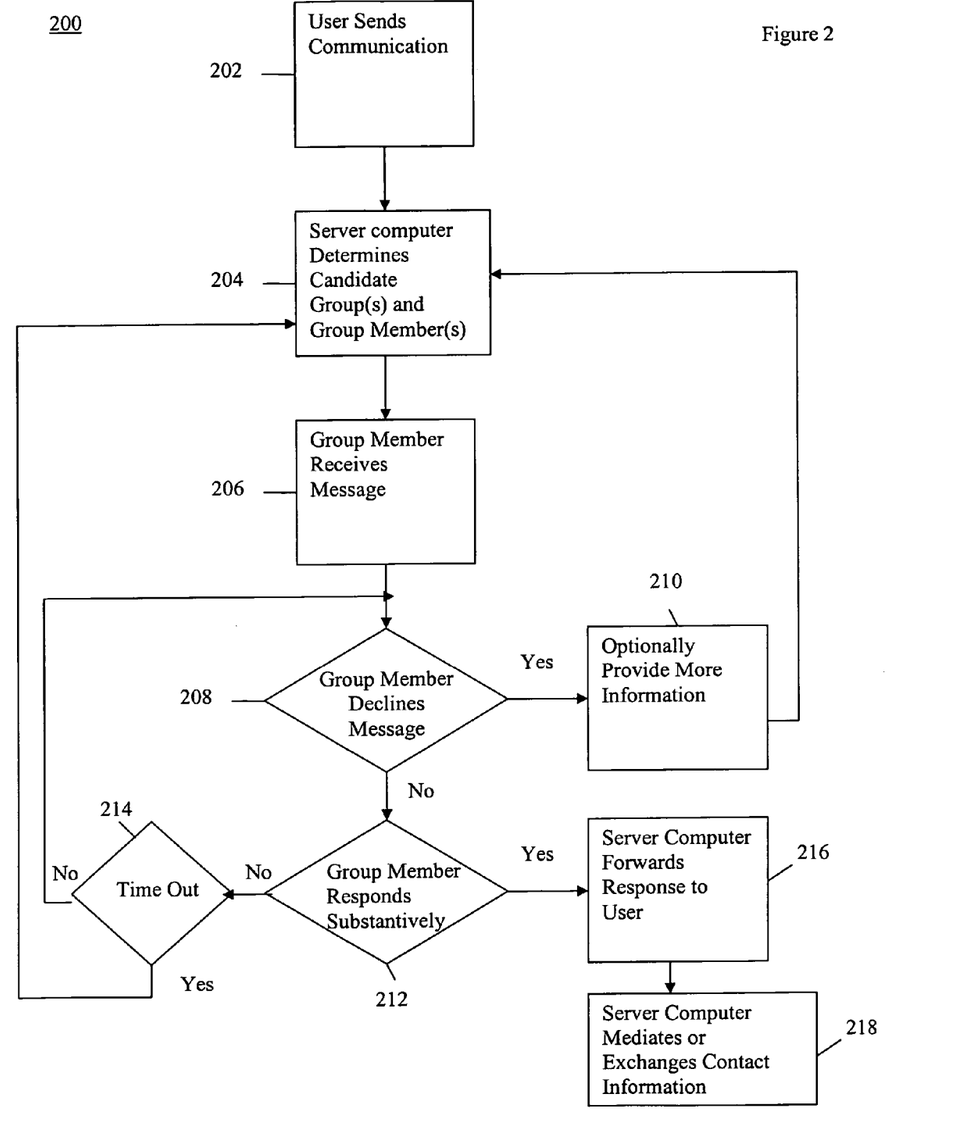
FIG. 2 is a flow diagram depicting an exemplary information exchange using the system of FIG. 1 according to an illustrative embodiment of the invention.

FIG. 2 is a flow diagram depicting an exemplary communication process 200 according to an illustrative embodiment of the invention. Referring to FIGS. 1 and 2, a user sends a communication (e.g., including a request for information) to the server computer 102 at step 202. At step 204, the server computer 102 identifies candidate group(s) (e.g., group 104, 106 and/or 108) to which to send the communication. According to the illustrative embodiment, the server computer 102 compares substantive characteristics of the communication with substantive characteristics of each of the groups 104, 106, 108 to determine one or more best matches between the communication and the available groups.

The substantive characteristics of the communication may be provided by the user, determined by the server computer 102 by analyzing the communication (e.g., using any suitable conventional keyword or contextual analysis approach), or by a combination of both. The substantive characteristics of the communication may include, without limitation, an academic field, such as a particular area of mathematics, literature, biology, chemistry, physics, language, engineering, art, politics, geography or the like. The substantive characteristics may also include other fields of relevancy, such as automotives, construction, plumbing, masonry, electrical wiring or the like. They may also include a field of sports, such as baseball, basketball, football, soccer, tennis, golf, skiing, sailing, skateboarding, ice skating, bicycling, auto racing and the like. The substantive characteristics may also any field of interest, about which a user may desire information. According to some embodiments, the substantive characteristics may also include any field in which a user might be seeking a product or service. The relevant field may also include any keywords thought to be relevant by the user or determined to have a high likelihood of relevance by the server computer 102. Preferably, the invention provides an on-line form for the user to complete to provide field information for the communication.

Figure 4A:
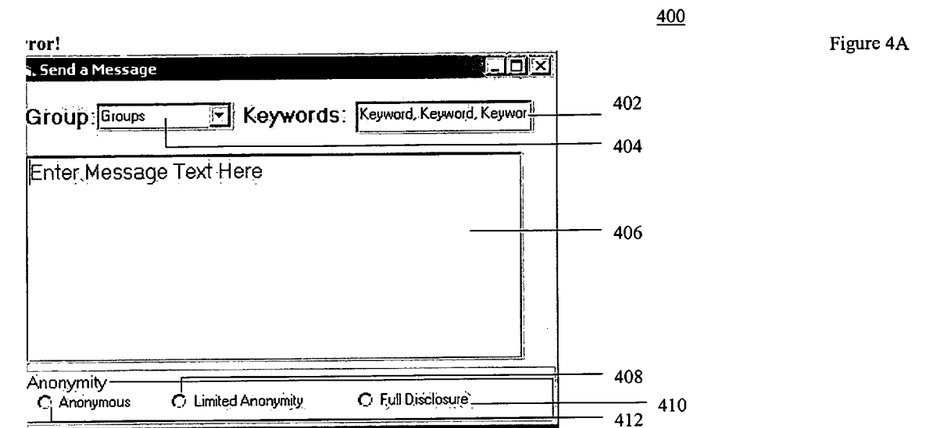
FIGS. 4A and 4B depict an exemplary display screen for sending a message according to an illustrative embodiment of the invention.
Figure 4B:
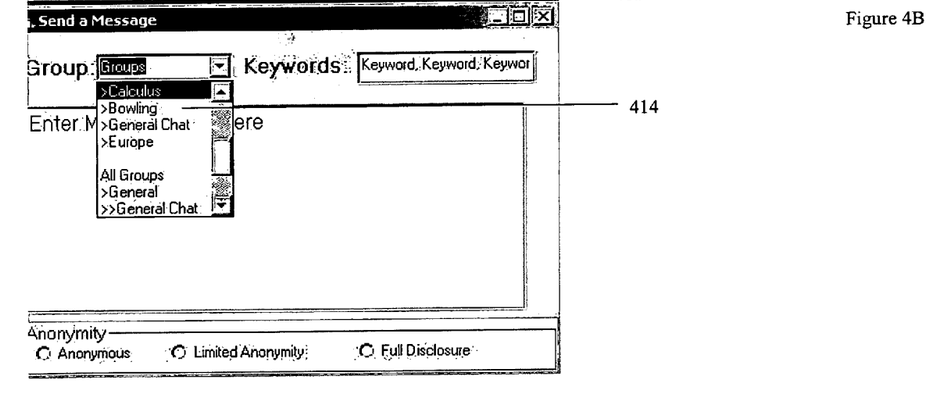

FIG. 4A depicts exemplary electronic forms for sending a message according to one illustrative embodiment of the invention. The form 400 includes a pull down menu 404 for selecting the group to which the message should be sent, a textbox 402 for entering additional keywords related to the message, and a textbox 406 for entering the message itself. FIG. 4B shows the list of groups in the activated pull down menu 404. The form 400 also includes 3 radio buttons 408, 410 and 412 for selecting a level of anonymity of the message. Although anonymity settings may be fashioned in any desired way, according to the illustrative embodiment, selecting limited anonymity 408 displays the contact or other personal information for the sender to the recipient who accepts the message. Selecting full disclosure/no anonymity 410 displays the information to any and all recipients of the message, while selecting anonymous 412 results in not displaying sender information to any recipient.

Figure 3:
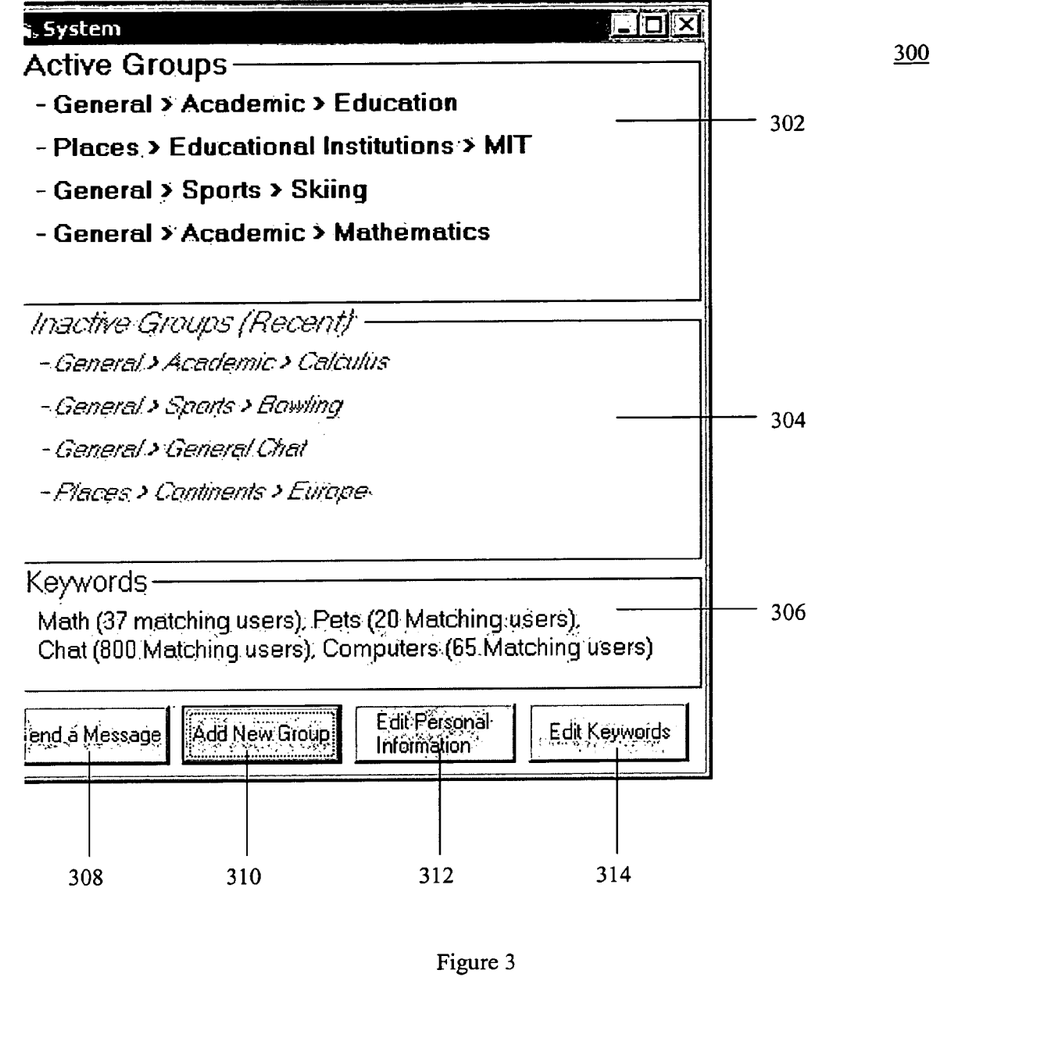
FIG. 3 is a display screen for a user interface for the system of FIG. 1 according to an illustrative embodiment of the invention.

The form 400 is accessed through a graphical user interface, such as the display screen 300 of FIG. 3. According to the illustrative embodiment, the user interface 300 enables a person to send a message (308), join and/or create a new group (310), edit personal information (312), and enter/edit key words (314). A text area 302 displays all of the groups to which a user is currently subscribed. Another text area 304 displays users recently subscribed to groups, to which the user no longer subscribes. Displaying such inactive groups makes it easier for a user to recreate and/or re-subscribe to such a group again. A text area 306 shows the user's current keywords. In one embodiment of the invention, these keywords help determine how likely a user is to receive a particular message, possible containing these keywords or keywords specified by the sender of a message. These keywords may be edited by a user by actuating the button 314. Personal information may be entered prior to joining a group by actuating the button 312. Actuating the button 308 displays the form 400 described above.

According to the illustrative embodiment, once the server computer determines one or more candidate groups 104, 106 and/or 108 to which the message might be sent, it then determines one or more candidate group members, such as the group members 104a-104c, 106a-106c, and/or 108a-108c, to whom the communication should be sent within the one or more candidate groups. The server computer 102 determines the one or more candidate group members by comparing the substantive characteristics of the communication with the substantive characteristics of the group members of the candidate groups and determining one or more best matches. According to one illustrative embodiment, the server computer 102 forwards the communication to only a single member of a single group. However, in other embodiments, the server computer 102 may forward the communication to more than one member of a particular group, or multiple members in different groups. According to one feature, the user can specify how many groups and/or how many members to whom the communication is to be forwarded.

According to an alternative illustrative embodiment, the server computer 102 compares the substantive characteristics of the communication to the substantive characteristics of the various group members 104a-104c, 106a-106c and 108a-108c, without first making a comparison between the substantive characteristics of the communication and the substantive characteristics of the groups. In some implementations, the user can specify to the server computer 102, which groups' members are to be considered for receiving the communication. In some instances, the user may specify which particular group members are to receive the communication. According to another feature, the user can specify to the server computer 102 particular qualifications a recipient group member must or should have.

As indicated at 208, in response to receiving the communication at step 206, the group member, for example, the group member 104a has an option to send a response to the server computer 102 explicitly declining to respond to the communication. At step 204, if the group member 104a explicitly declines to respond, the server computer 102 determines a next best match and forwards the communication to that new group member. At step 210, if the group member 104a explicitly declines, he/she may provide or be prompted to provide additional information, such as a suggestion regarding who might be an appropriate person to forward the communication. If the group member 104a provides such additional information, the server computer 108 may take the information into account when determining to whom next to forward the communication from user.

At steps 212 and 214, if the user does not explicitly decline to respond and does not respond substantively, the server computer determines if a timeout period has occurred. As shown at step 214, in response to the timeout period occurring, the server computer, at step 204, determines a next best match and forwards the communication to that group member, for example, group member 104b. If a timeout has not occurred, the server computer 102 loops back to step 208 to check for an explicit decline from the group member 104a. Optionally, the group member 104a can forward the communication directly to another group member, such as group member 106a. If the group member 104a informs the server computer 102 of this occurrence, the server computer 102 resets the timeout and treats the situations as if it actually forwarded the communication to the group member 106a. If the group member 104a does not inform the server computer 102 that it forward the message to the group member 106a, the server computer 102 times out, unless it receives a response from the group member 106a within the time originally allotted to the group member 104a.

As shown at step 216, in response to receiving a substantive response from a group member, the server computer 102 forwards the response to the user. According to user and member preferences, the server 218 may either mediate further communications between the user and the group member, maintaining the anonymity of both the user and the group member, or provide contact information to the user and/or the group member to initiate an unmediated dialog between the user and the group member.

According to the illustrative embodiment, member groups may be predefined by the system, may be organized by group members, or may be a combination of both. In the case of a group being initiated by a person trying to organize a group, the person enters relevant group information of the type discussed above with regard to FIGS. 1 and 2 via an online form. The online form for registering a group may include any combination of data fields, text fields, check boxes, radio buttons, rating scales, pull-down menus or the like to enable the person to enter the relevant information about the group.

Figure 6:
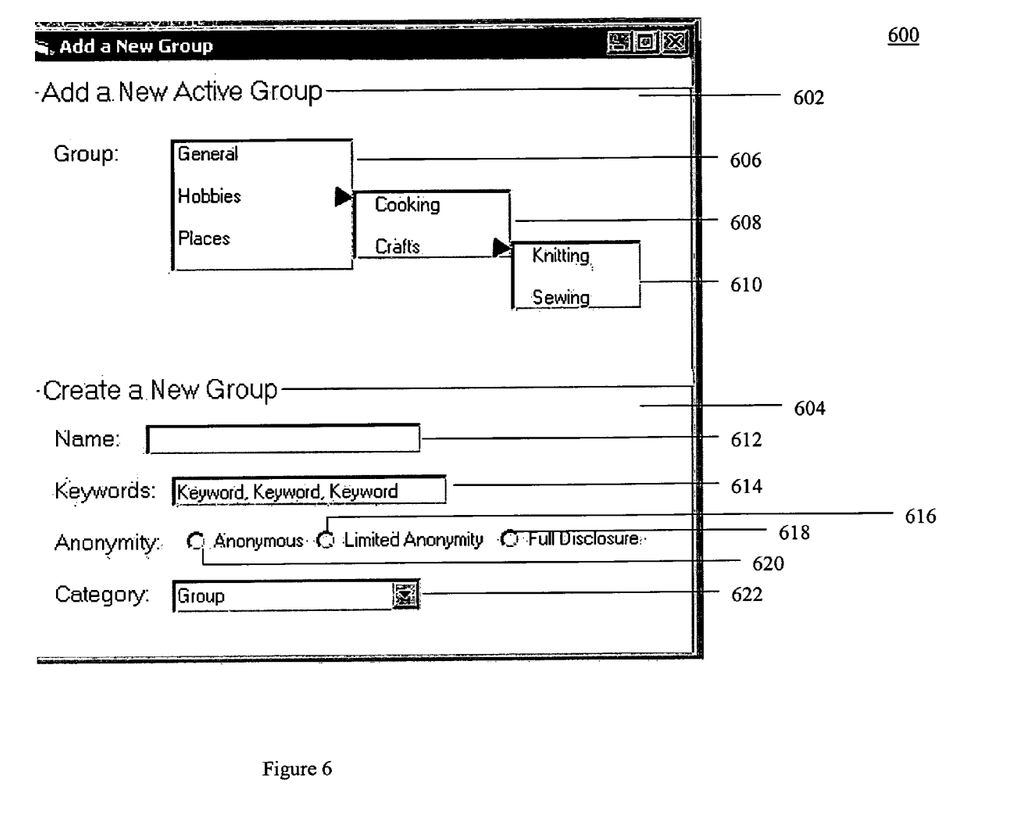
FIG. 6 is an exemplary display screen for both adding a group and creating a group according to an illustrative embodiment of the invention.

FIG. 6 depicts an exemplary display screen 600 for joining an existing group 604 and/or creating a new group 602. The area 604 for joining a preexisting group includes a series of selection boxes 606, 608 and 610 for displaying preexisting groups and subgroups, which a user may select to identify a particular existing group to which he/she would like to join. The area 602 for creating a new group includes a text field 612 for entering the name of the new group, a text field 614 for entering keywords associated with the new group, a plurality of radio buttons 616, 618 and 620 for setting the default anonymity of messages sent to the group, and a pull down menu 222 for selecting a category under which the new group falls. In one embodiment of the invention, the radio buttons associated with the default anonymity of messages sent to the group correspond to limited anonymity 616, anonymity 620 and no anonymity 618, in a similar fashion to that described above with regard to FIGS. 4A and 4B. The display screen 600 may be activated, for example, by actuating the button 310 of the display screen 300 of FIG. 3.

In the case where the groups are predefined, an applicant wishing to join (i.e., subscribe to) a group enters his/her relevant information into an on-line form including any combination of data fields, text fields, check boxes, radio buttons, rating scales, pull-down menus or the like to enable the applicant to enter information such as the group information described above with regard to FIGS. 1 and 2.

Figure 5:
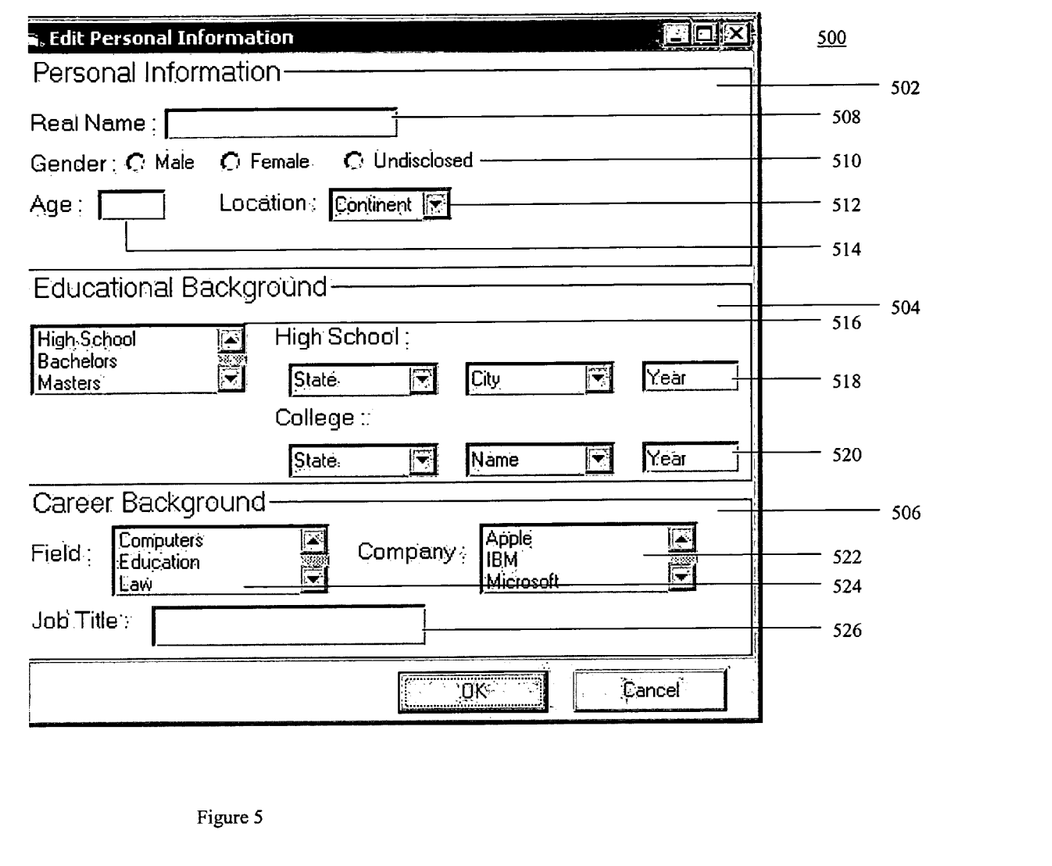
FIG. 5 is an exemplary display screen for providing personal information for application to join a group according to an illustrative embodiment of the invention.

FIG. 5 depicts an exemplary display screen 500 for enabling a user to enter the requisite information. The screen 500 includes an area 502 for entering personal information, an area 504 for entering educational background information, and an area 506 for entering career information. Personal information in area 502 includes, without limitation, the name of the user entered in text field 508, the gender of the user entered by selecting between radio buttons 510, a pull down menu 512 for entering the user's location, such as city, state, country, continent or the like, and a text field 514 for entering the user's age. The educational background area 504 includes a selection box 516 for identifying a level of education 516, an area 518 for entering high school information, and an area 520 for entering college information. The career background area 506 includes a selection box 524 for identifying the field in which the user works, a selection box 522 for indicating a company at which the user works, and a text field 526 for indicating a user's job title. The form 500 may be activated, for example, by actuating the button 312 of the user interface 300 of FIG. 3.

The server computer 102 may assign the applicant to one or more groups by comparing the information entered by the user to information stored in the database 120 about the various groups. Alternatively or in combination, the server computer 102 may circulate the completed form to the available member groups and allow them to decide or comment on whether to allow the person to subscribe to the particular group. According to another illustrative embodiment, system administrators independently verify the information provided by applicants to groups to ensure only qualified applicants are admitted to each of the groups.

According to the illustrative embodiment, a person may be a member in more than one group. In one implementation, a user must be a member of a group to send communications (e.g., queries) to that group. However, in an alternative illustrative embodiment, this need not be the case. According to one feature, group membership is dynamic and may be changed at any time. One advantage of the dynamic nature of the groups is that it enables a person to control and fine tune the types and number of communications he/she receives from users.

The systems, methods and features of the invention may be employed in a plurality of commercial embodiments. By way of example, the invention may be employed in an academic setting, where the groups are formed by professors organized according to academic discipline. A user (e.g., a student) may submit a question related to the academic disciplines to the server computer 102, which would then route the question to a professor best qualified, under the circumstances (e.g., taking into account availability, etc.), to answer the question. A dialog would then proceed as described above. According to one implementation, students may pay a service fee for being able to submit communications. Alternatively, schools may pay a service fee for their professors to belong to the service and for their students to be able to submit communications.

By way of another example, students may organize themselves into groups, based on area of academic study. In this case, students may be available to field questions from other students. Group members may be able to submit questions for free or for a reduced fee, while non-member students may be required to pay or pay an increased fee.

The invention may also be employed as an enhanced customer support system in which customer support personnel for a particular product are members of a single group, with the server computer 102 routing questions regarding the product to a service person most qualified to field a particular question. In a variation, service persons having expertise regarding particular aspects of a product may be organized into different groups, further facilitating having a particular communication routed to the most qualified available person. According to a feature of this implementation, the group member to whom the server computer routes the communication can then decide, after seeing a communication, if he or she has the expertise to answer that particular communication. If not, the initial group member can, for example, cause the server computer to automatically forward it to another customer support member or specify another customer support to whom it may be forwarded. Users may pay a subscription fee to be able to query such a user support system. Additionally, the invention is flexible enough that unrelated experts may be able to sign up for a support services group, and be paid, for example, by the service on a per communication handled basis. Since a group member may render service from any location, and full-time or even regular employment need not be a requirement, a wider range of qualified support personal may be made available to a user. The invention may also include a user feedback/rating mechanism, so that service ratings for a particular group and/or group member may be made available to a user.

Systems and methods of the invention may also be implemented as a mechanism for finding goods and/or services, where those selling goods and/or services may be members of a group. Those looking for goods and/or services can send communications, including product/service requests, to the service computer, which then routes the request to a suitable group and/or group member. As in the case of support service providers, a user rating may be established and made publicly available for each of the groups and group members. Alternatively, those seeking goods and/or services may be group members, with those selling them sending the communications.

As mentioned above with respect to particular illustrative embodiments, the invention includes features directed to generating revenue. By way of example, the user may be charged a fee for routing communications to one or more group members. The fee may be, for example, a periodic subscription fee, a per communication fee or other fee. Group members may also or alternatively be charged a fee for belonging to a group.

In some configurations, members are charged a per group fee, while in other configurations, they are charged a periodic fee. In some instances, group members may be paid or earn discounts on membership by responding to communications from the server computer, and/or agreeing to be available to respond to such communications. It should be noted that users may also be group members and vice versa. According to one illustrative embodiment, group members are charged a fee to belong to a support service group, but are then paid on a per communication handled.

As can be seen from the above description, the illustrative embodiments of the invention provide numerous advantages over the conventional network communication approaches. For example, according to one feature, the invention does not require a user to specify a unique identifier of the recipient of a communication. Also, it does not, by default, broadcast simultaneously to a plurality of recipients. Though, in some embodiments, the user may select such a feature. According to another advantage, the invention discontinues forwarding the communication once a recipient of a group accepts and responds to the communication. According to further advantage, the invention enables recipients to see the request before they choose to accept, decline or forward the communication. An additional advantage is that the server computer of the invention evaluates detailed substantive characteristics regarding expertise of group members in deciding to whom to forward the communication. The user may also be given access to such information so that he/she can weigh the expertise of the group member when judging the quality/reliability of any response. The user may also have access to a public user rating for the group member who responds to a communication, to be able to further judge the quality/reliability of the response. Also, according to another feature, the invention enables a user to send multiple same or different communications in parallel, for example, to process multiple information requests in parallel or to test consistency of response with regard to a single information request.

What is claimed is:

1. A method for communicating over a computer network comprising:
   receiving, at a server computer, a communication from a user to the server computer on the network, wherein the communication comprises at least one of: e-mail, telephone call, short message service (SMS) message, on-line form submission, on-line message, chat message, sale listing, wanted listing, request for information and bulletin board message;
   determining, at the server computer, substantive characteristics of the communication, wherein substantive characteristics comprises keywords that describe a field to which the communication is relevant, wherein the field comprises at least one of a field of interest, a field of expertise, and a field of knowledge;
   comparing, at the server computer, the substantive characteristics of the communication with substantive characteristics of a plurality of members of at least one of a plurality of member groups, wherein the substantive characteristics of the plurality of group members comprise at least one of a field of interest, a field of expertise, and a field of knowledge, and the comparing comprises finding one or more matches between the substantive characteristics of the communication and the substantive characteristics of the plurality of members;
   routing the communication, at the server computer, to a first of the plurality of members based, at least in part, on the comparison between the substantive characteristics of the communication with the substantive characteristics of the plurality of members;
   determining, at the server computer, whether a timeout period has occurred, wherein the timeout period occurs if the first of the plurality of members does not explicitly decline to respond and does not respond substantively before the end of the timeout period; and
   in response to the timeout period occurring, routing the communication at the server computer to a second one of the plurality of members, selection of the second one of the plurality of members being based, at least in part, on the comparison between the substantive characteristics of the communication with the substantive characteristics of the plurality of members.

2. The method of claim 1, further comprising:
routing the communication, at the server computer, to only the first of the plurality of members.

3. The method of claim 1, further comprising:
providing an option for the user to specify to the server computer at least some of the substantive characteristics of the communication.

4. The method of claim 1, further comprising:
providing an option for the user to specify to the server computer particular ones of the plurality of members to which the communication is to be routed, regardless of the comparison of the substantive characteristics.

5. The method of claim 1, further comprising:
providing an option for the user to specify to the server computer particular ones of the member groups to which the communication is to be routed, regardless of the comparison of the substantive characteristics.

6. The method of claim 1, further comprising:
determining, at the server computer, which of the plurality of members of the at least one member group are currently logged into the network;
selecting, at the server computer, the first of the plurality of members based, at least in part, on the determination of which of the plurality of members are logged into the network.

7. The method of claim 1, further comprising:
comparing, at the server computer, the substantive characteristics of the communication with substantive characteristics of the plurality of member groups;
selecting, at the server computer, the at least one member group based, at least in part, on the comparison between the substantive characteristics of the communication with the substantive characteristics of the plurality of groups.

8. The method of claim 7, further comprising:
providing an option for the user to specify to the server computer at least some of the substantive characteristics of the member groups to consider during the comparison of the substantive characteristics of the communication with the substantive characteristics of the plurality of member groups.

9. The method of claim 7, further comprising:
providing an option for the user to specify which of the plurality of member groups are to have their substantive characteristics compared with the substantive characteristics of the communication.

10. The method of claim 7, further comprising:
providing an option for the user to specify to the server computer a subset of the substantive characteristics of the communication.

11. The method of claim 1, further comprising:
receiving a substantive response to the communication from the first of the plurality of members; and
routing the substantive response to the user.

12. The method of claim 1, further comprising:
providing an option for the first of the plurality of members to route the communication to a second one of the plurality of members.

13. The method of claim 1, further comprising:
obtaining from the plurality of members, at the server computer, the substantive characteristics for each of the plurality of members.

14. The method of claim 13, wherein the substantive characteristics include at least one of: educational background, abstracts of publications, patents, age, gender, and current educational status.

15. The method of claim 13, wherein the substantive characteristics include at least one of: information regarding willingness to respond to questions, willingness to provide advice, willingness to be in direct (non-anonymous) communication with a sender of a communication, list of group memberships.

16. The method of claim 13 comprising:
assigning a particular member to a particular one of the plurality of groups based, at least in part, the substantive characteristics for the particular member.

17. The method of claim 1 comprising:
charging the user a fee for routing the communication.

18. The method of claim 17, wherein the fee includes a periodic service fee.

19. The method of claim 17, wherein the fee includes a per communication fee.

20. The method of claim 1 comprising:
charging the first group member a fee for belonging to the group.

21. The method of claim 20 comprising:
reducing the fee if the first group member agrees to be available to respond to user communications.

22. The method of claim 1 comprising:
paying the first group member for responding to the communication.

23. A system for communicating over a computer network comprising:
a client device in communication with a network;
a server computer in communication with the network for processing communications from the client device, the server computer configured to:
determine substantive characteristics of the communication, wherein:
the communication comprises at least one of: e-mail, telephone call, short message service (SMS) message, on-line form submission, on-line message, chat message, sale listing, wanted listing, request for information and bulletin board message; and
substantive characteristics comprises keywords that describe a field to which the communication is relevant, wherein the field comprises at least one of a field of interest, a field of expertise, and a field of knowledge;
compare the substantive characteristics of the communication with substantive characteristics of a plurality of members of at least one of a plurality of member groups, wherein the substantive characteristics of the plurality of group members comprise at least one of a field of interest, a field of expertise, and a field of knowledge, and the comparing comprises finding one or more matches between the substantive characteristics of the communication and the substantive characteristics of the plurality of members; and
route the communication to a first of the plurality of members based, at least in part, on the comparison between the substantive characteristics of the communication with the substantive characteristics of the plurality of members;
determine, whether a timeout period has occurred, wherein the timeout period occurs if the first of the plurality of members does not explicitly decline to respond and does not respond substantively before the end of the timeout period; and
in response to the timeout period occurring, route the communication to a second one of the plurality of members, selection of the second one of the plurality of members being based, at least in part, on the comparison between the keywords of the question with the substantive characteristics of the member profiles.

24. A method for knowledge exchange comprising:
receiving, at a server computer, a question related to a common field of interest from a user;
determining, at a server computer, keywords related to the question;
determining, at the server computer, the availability of the members within the common field of interest;
comparing, at the server computer, the keywords with substantive characteristics in member profiles of a plurality of members within the common field of interest, wherein comparing comprises finding one or more matches between the keywords and the substantive characteristics of member profiles;
routing, at the server computer, the question to a first of the plurality of members based at least in part on the availability and comparison;
determining, at the server computer, whether a timeout period has occurred, wherein the timeout period occurs if the first of the plurality of members does not explicitly decline to respond and does not respond substantively before the end of the timeout period; and
in response to the timeout period occurring, routing the question at the server computer to a second one of the plurality of members, selection of the second one of the plurality of members being based, at least in part, on the comparison between the keywords of the question with the substantive characteristics of the member profiles.

25. The method of claim 24, further comprising:
receiving a substantive response to the question from the first of the plurality of members; and
routing the substantive response to the user.

26. The method of claim 24, further comprising:
receiving payment from the user for routing the question.

27. A method for routing communications in a customer support center comprising:
receiving, at a server computer, an inquiry over the phone or in an online message related to a consumer product from a customer;
determining, at a server computer, substantive characteristics related to the inquiry;
comparing, at the server computer, the substantive characteristics of the inquiry with attributes in the expertise profiles of a plurality of service members, wherein comparing comprises finding one or more matches between the substantive characteristics of the inquiry and the attributes in the expertise profiles;
routing the inquiry to a first of the plurality of service members that best matches the substantive characteristics of the inquiry;
determining, at the server computer, whether a timeout period has occurred, wherein the timeout period occurs if the first of the plurality of service members does not explicitly decline to respond and does not respond substantively before the end of the timeout period; and in response to the timeout period occurring, routing the inquiry at the server computer to a second one of the plurality of service members, selection of the second one of the plurality of service members being based, at least in part, on the comparison between the substantive characteristics of the inquiry with the attributes in the expertise profiles.

28. The method of claim 27, wherein:

the substantive characteristics related to the inquiry includes a feature of the consumer product;

the plurality of service members belong to a group whose members have expertise in the feature of the consumer product.

29. A method for commerce comprising:

receiving, at a server computer, a request from a user, wherein the request is related to at least one of: selling a good, buying a good, trading a good, selling a service, buying a service and trading a service;

determining, at a server computer, substantive characteristics related to the request, wherein the substantive characteristics are related to the good or service;

comparing, at a server computer, the substantive characteristics of the request with the substantive characteristics in the profiles of a plurality of group members by finding one or more matches between the substantive characteristics of the request and the substantive characteristics of the group member profiles;

routing the request to a first of the plurality of group members whose profile best matches the substantive characteristics of the inquiry;

determining, at the server computer, whether a timeout period has occurred, wherein the timeout period occurs if the first of the plurality of group members does not explicitly decline to respond and does not respond substantively before the end of the timeout period; and in response to the timeout period occurring, routing the request at the server computer to a second one of the plurality of group members, selection of the second one of the plurality of group members being based, at least in part, on the comparison between the substantive characteristics related to the request with the substantive characteristics in the group member profiles.

30. The method of claim 29, further comprising:

receiving a substantive response to the request from the first of the plurality of members; and routing the substantive response to the user.

31. The method of claim 1, wherein the substantive characteristics of the communication comprises at least one of an academic field, a sports field, and a field of a product or service.

32. The method of claim 1, wherein the server computer does not receive from the user a unique identifier of recipient to whom the communication should be routed.

33. The method of claim 1, wherein the server computer determines a substantive characteristic of the communication by analyzing the communication using contextual analysis.

* * * * *